United States Patent
Weaver et al.

(10) Patent No.: US 10,823,289 B2
(45) Date of Patent: Nov. 3, 2020

(54) FLOATING DUCTS

(71) Applicant: Bell Helicopter Textron Inc., Fort Worth, TX (US)

(72) Inventors: Keith David Weaver, North Richland Hills, TX (US); David Angell, Fort Worth, TX (US); Nicholas Plagianos, N. Richland Hills, TX (US); Thomas Mast, Carrollton, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 301 days.

(21) Appl. No.: 15/816,516

(22) Filed: Nov. 17, 2017

(65) Prior Publication Data

US 2019/0154154 A1   May 23, 2019

(51) Int. Cl.
*B64D 33/04* (2006.01)
*F16J 15/08* (2006.01)
*F01N 13/18* (2010.01)
*B64C 27/06* (2006.01)

(52) U.S. Cl.
CPC .......... *F16J 15/0818* (2013.01); *B64D 33/04* (2013.01); *F01N 13/1811* (2013.01); *B64C 27/06* (2013.01); *F01N 13/185* (2013.01); *F01N 13/1827* (2013.01); *F01N 2470/10* (2013.01); *F01N 2470/24* (2013.01); *F01N 2590/00* (2013.01)

(58) Field of Classification Search
CPC ... F16J 15/0818; B64D 33/04; F01N 13/1811; B64C 27/06
See application file for complete search history.

(56) References Cited

U.S. PATENT DOCUMENTS

| | | | | |
|---|---|---|---|---|
| 3,573,871 A | * | 4/1971 | Warner | ................ F16L 17/025 |
| | | | | 277/607 |
| 2006/0060417 A1 | * | 3/2006 | Williams | ............... B64D 41/00 |
| | | | | 181/214 |
| 2015/0291288 A1 | * | 10/2015 | Bofill | .................... B64D 33/02 |
| | | | | 244/53 B |

FOREIGN PATENT DOCUMENTS

| EP | 3199767 | * | 8/2017 |
| EP | 3199767 A1 | | 8/2017 |

OTHER PUBLICATIONS

Bell Helicopter Textron Inc., "Bell 525 Relentless" Poster, Nov. 12, 2014.

(Continued)

*Primary Examiner* — Justin M Benedik
(74) *Attorney, Agent, or Firm* — Daniel J. Chalker; Edwin S. Flores; Chalker Flores, LLP

(57) ABSTRACT

A duct interface system and method includes a duct having a first end and a second end; a first receptacle for the first end of the duct and/or a second receptacle for the second end of the duct; and one or more first seals between the first end of the duct and the first receptacle and/or one or more second seals between the second end of the duct and the second receptacle.

20 Claims, 5 Drawing Sheets

(56) References Cited

OTHER PUBLICATIONS

Jerry, Dominic "ANALYSIS: Bell 525 Relentless cutaway and technical Description" https://www.flightglobal.com/news/articles/analysis-bell-525-relentless-cutaway-and-technical-4055411, Source: Bell Helicopter,Flight International, London, Nov. 12, 2014, 8 pp.
European Patent Office, European Search Report for EP Appl. No. 17211165.0 dated Mar. 27, 2018, 5 pp.
European Patent Office, Communication pursuant to Article 94(3) EPC for EP Appl. No. 17211165.0 dated Jun. 18, 2018, 6 pp.
European Patent Office, Communication pursuant to Article 94(3) EPC for EP Appl. No. 17211165.0 dated Dec. 11, 2018, 5 pp.

* cited by examiner

FLOATING DUCTS

CROSS-REFERENCE TO RELATED APPLICATIONS

Not applicable.

STATEMENT OF FEDERALLY FUNDED RESEARCH

Not applicable.

TECHNICAL FIELD OF THE INVENTION

The present invention relates in general to the field of duct interfaces in aircraft systems, and more particularly, to a novel system for duct interfaces without supports or fasteners for use in an aircraft.

BACKGROUND OF THE INVENTION

Without limiting the scope of the invention, its background is described in connection with duct interfaces in rotorcraft.

One example of an aircraft is a rotorcraft. A rotorcraft may include a number of ducts, including, for example, exhaust ducts to guide exhaust from one or more engines, one or more electrical generators, or one or more oil cooler blowers to the exterior of the rotorcraft. Such ducts must be sealed at both ends to reduce or eliminate leakage of hot, exhaust-laden air into one or more interior compartments of the rotorcraft.

Existing methods and apparatuses for sealing the ends of ducts include mechanical connections such as fasteners and clamps. During the operation of a rotorcraft, the airframe normally flexes slightly, causing interior components such as ducts and the devices to which they are connected to flex. Under normal flexing, the mechanical attachments that seal the ends of ducts, such as fasteners or clamps, will work loose, compromising the seals. To maintain the duct seals, mechanical attachments must be maintained, for instance by tightening or replacing them, increasing the cost of operation of the rotorcraft. To further increase aircraft safety and to lower operations costs, an improved system and method for sealing ducts is desirable.

SUMMARY OF THE INVENTION

In some embodiments of the disclosure, a system is disclosed as including a duct having a first end and a second end; a first receptacle for the first end of the duct and/or a second receptacle for the second end of the duct; and one or more first seals between the first end of the duct and the first receptacle and/or one or more second seals between the second end of the duct and the second receptacle. In some aspects, the one or more first seals are operable to allow motion of the first end of the duct relative to the first receptacle and/or the one or more second seals are configured to allow motion of the second end of the duct relative to the second receptacle. In some aspects, the motion does not substantially break a seal formed by the one or more first seals and/or the one or more second seals. In some aspects, the first end of the duct and the first receptacle and/or the second end of the duct and the second receptacle are coupled to an inlet port. In some aspects, the first end of the duct is coupled to the first receptacle and the second end of the duct is coupled to the second receptacle without any fasteners. In some aspects, the first end of the duct is coupled to the first receptacle and/or the second end of the duct is coupled to the second receptacle without any clamps. In some aspects, the first seal is the only device coupling the first end of the duct to the first receptacle and/or the second seal is the only device coupling the second end of the duct to the second receptacle. In some aspects, the first receptacle is coupled to an inlet port. In some aspects, the second receptacle is coupled to an outlet port. In some aspects, the first seal(s) and/or the second seal(s) are bulb seals, compressible seals, foam seals or gaskets.

In some embodiments of the disclosure, a method is disclosed as providing a duct having a first end and a second end, and a first receptacle for the first end of the duct and/or a second receptacle for the second end of the duct, and using one or more first seals to substantially seal the first end of the duct at the first receptacle and/or using one or more second seals to substantially seal the second end of the duct at the second receptacle. In some aspects, the method further includes configuring the one or more first seals to substantially seal the first end of the duct at the first receptacle to allow motion of the first end of the duct relative to the first receptacle and/or configuring the one or more second seals to substantially seal the second end of the duct at the second receptacle to allow motion of the second end of the duct relative to the second receptacle. In some aspects, the method further includes configuring the one or more first seals such that the motion of the first end of the duct relative to the first receptacle does not substantially break a first seal formed by the one or more first seals and/or configuring the one or more second seals such that the motion of the second end of the duct relative to the second receptacle does not substantially break a second seal formed by the one or more second seals. In some aspects, the method further includes coupling the first end of the duct and the first receptacle and/or between the second end of the duct and the second receptacle to an input port or an output port without a mechanical attachment. In some aspects, the coupling is accomplished without a fastener or a clamp. In some aspects, the one or more first seals are the only devices securing the first end of the duct to the first receptacle and/or the one or more second seals are the only devices securing the second end of the duct to the second receptacle. In some aspects, the first receptacle is coupled to an inlet port. In some aspects, the second receptacle is coupled to an outlet port. In some aspects, the first seal(s) and/or the second seal(s) are bulb seals, compressible seals, foam seals or gaskets.

In some embodiments of the disclosure, a rotorcraft is disclosed as including a fuselage; an engine compartment coupled to the fuselage; an engine coupled to the engine compartment and disposed within the engine compartment; a duct coupled to the fuselage, the duct having a first end and a second end; one or more first seals coupled to the first end of the duct and/or one or more second seals coupled to the second end of the duct; and a first receptacle coupled to the first one or more seals and/or a second receptacle coupled to the second one or more seals, wherein the duct connects an inlet port to an outlet port. In some aspects, the first seal(s) and/or the second seal(s) are bulb seals, compressible seals, foam seals or gaskets.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
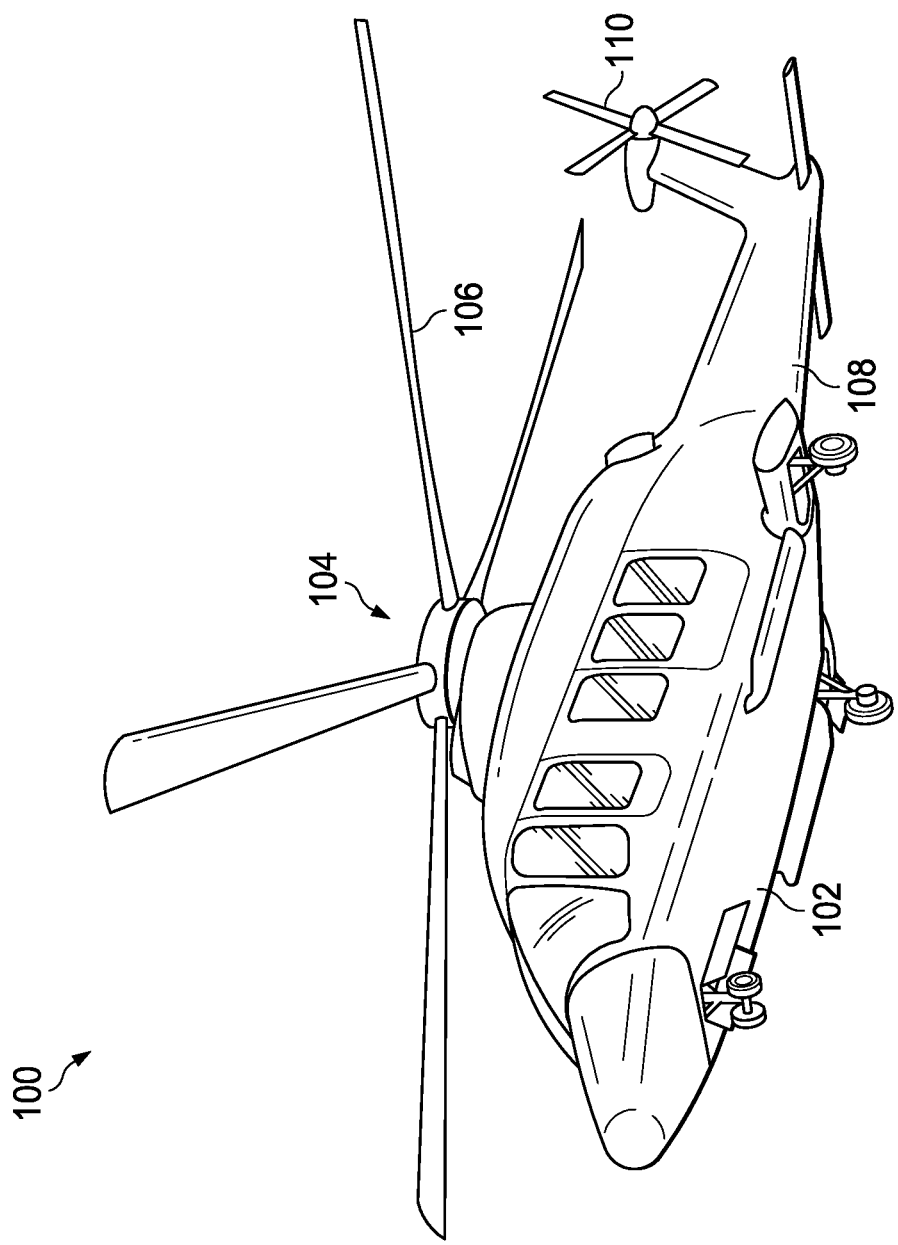
FIG. 1 shows a side view of a helicopter according to a particular embodiment of the present application.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
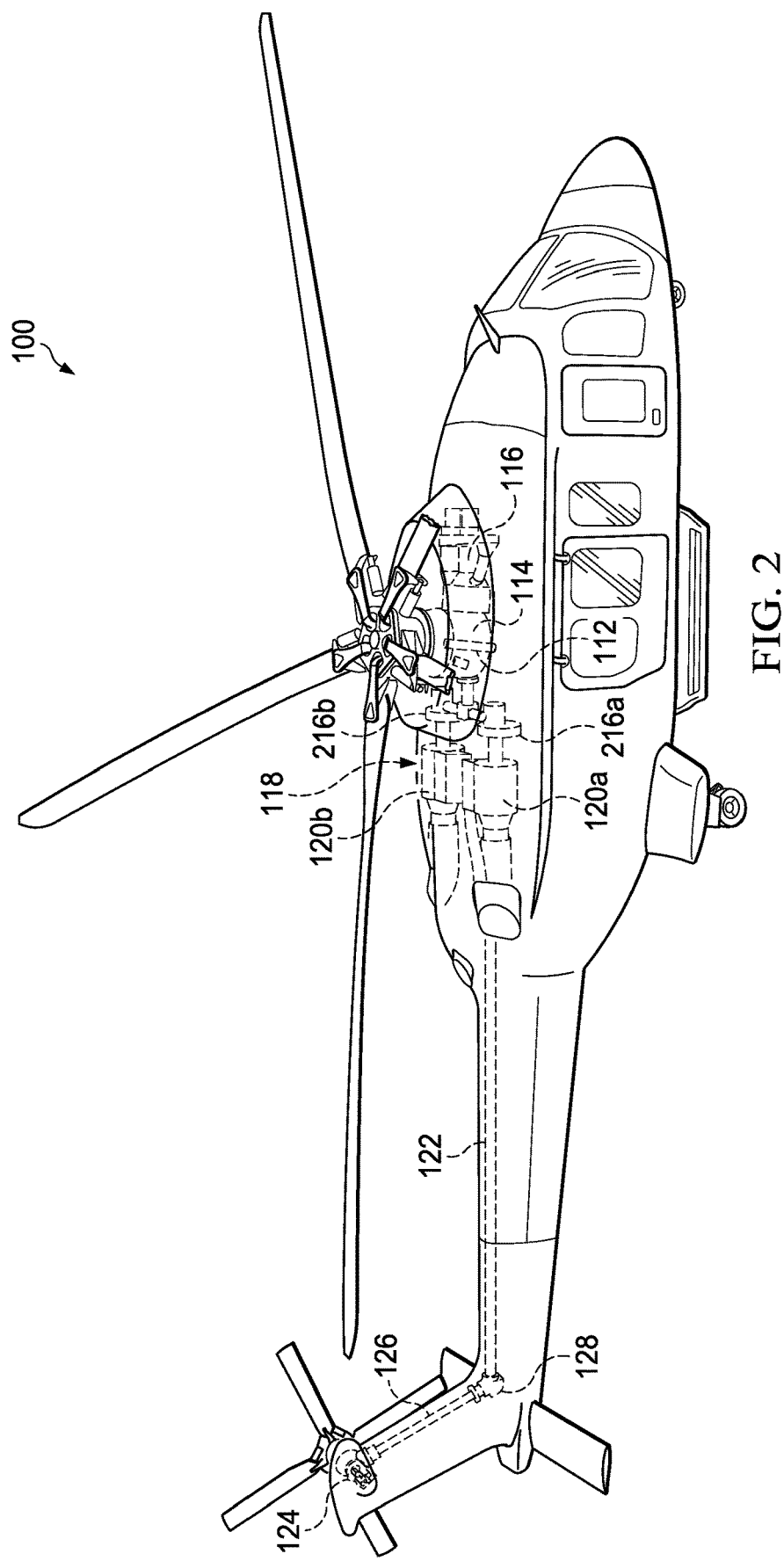
FIG. 2 shows a partial cross-section, perspective view of a helicopter according to an embodiment of the present application.

For example, FIG. 2 shows a partial cross-section perspective view of aircraft 100 that includes additional detail of an embodiment of the present invention. Aircraft 100 further includes a rotor mast 112, which is connected to the main rotor gearbox 114. The main rotor gearbox 114 is connected to one or more accessory gear boxes 116 and one or more reduction gearboxes 216a, 216b. Each reduction gearbox 216a, 216b is connected to one or more engines 120a, 120b, which are within an engine compartment 118. A tail rotor drive shaft 122 transmits mechanical rotation from the main rotor gearbox 114 to the tail rotor gear box 124, which is connected via tail rotor drive shaft 126 and intermediate gear box 128.

Figure 3:
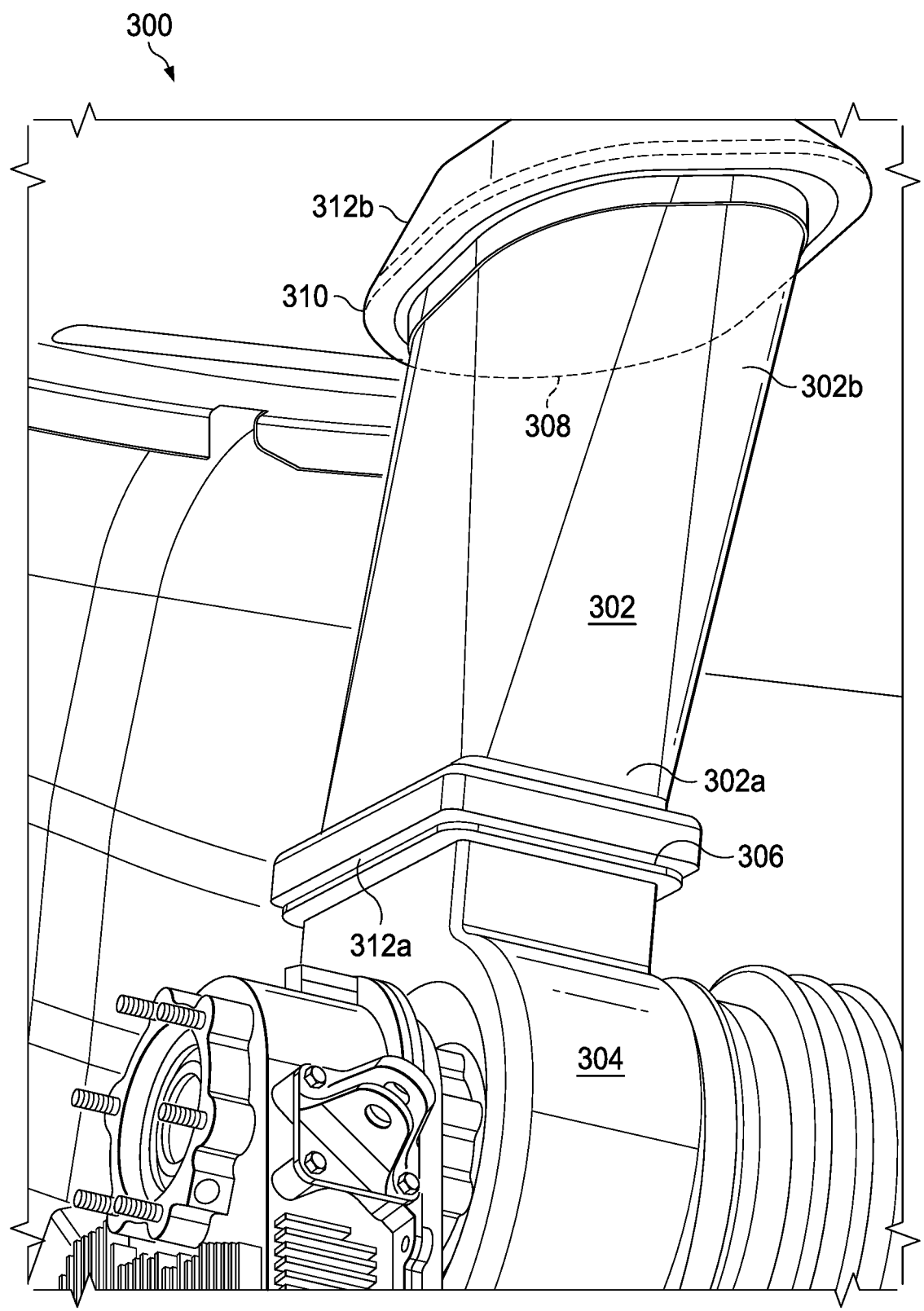
FIG. 3 shows a perspective view of a duct, and items to which the duct is attached, according to a particular embodiment of the present invention.

FIG. 3 shows a perspective view of a duct interface system 300, and items to which the duct 302 is attached, according to a particular embodiment of the present invention. Duct 302 is coupled at inlet end 302a to an inlet port 304 (e.g., an oil cooler blower housing, etc.) at the inlet receptacle 306 in the aircraft 100 of FIGS. 1 and 2. The outlet end 302b of the duct 302 is coupled to an outlet port 308 (e.g., an exhaust fairing, etc.) at the outlet receptacle 310 that leads to the exterior of the aircraft 100 of FIGS. 1 and 2. One or more seals 312a, 312b between the inlet receptacle 306 and the inlet end 302a and between the outlet receptacle 310 and the outlet end 302b, respectively, substantially seal the inlet end 302a and the outlet end 302b of the duct 302. One or more seals 312a, 312b provide buffering, support and/or sealing for inlet end 302a and outlet end 302b of duct 302 without the need for fasteners or clamps. The seal(s) 312a, 312b can be bulb seals, compressible seals, foam seals, gaskets any other suitable material/seal.

In one aspect of the embodiment illustrated, the duct may be duct 302, the first end of the duct may be inlet end 302a, the second end of the duct may be outlet end 302b, the first receptacle may be inlet receptacle 306, the second receptacle may be outlet receptacle 310, and the first seals and the second seals may be seals 312a, 312b, respectively.

During operation of the aircraft 100 of FIGS. 1 and 2, the fuselage 102 will flex, and cause components within to move, such as, the duct 302 and the inlet port 304 (e.g., oil cooler blower housing, etc.). One or more seals 312a, 312b allow the duct 302 to move relative to the inlet port 304 (e.g., oil cooler blower housing, etc.) and the outlet port 308 without creating substantial openings at the seals 312a, 312b or quickly degrading the one or more seals 312a, 312b. In another embodiment of the invention, one or more seals 312a, 312b are configured to allow motion of the duct 302 with inlet end 302a and outlet end 302b relative to inlet receptacle 306 and/or outlet receptacle 310 such that the motion does not substantially break the seals formed by the one or more seals 312a, 312b. In another embodiment of the invention, mechanical attachments such as fasteners or clamps are excluded from the duct interface system 300 that connect duct 302 with inlet end 302a and outlet end 302b to the inlet receptacle 306 and outlet receptacle 310. In another embodiment of the invention, one or more seals 312a, 312b are the only devices coupling the duct 302 with inlet end 302a and outlet end 302b to the inlet receptacle 306 and/or the outlet receptacle 310. In some embodiments, the inlet receptacle 306 is coupled to an inlet port. In some aspects, the outlet receptacle 310 is coupled to an outlet port.

Figure 4:
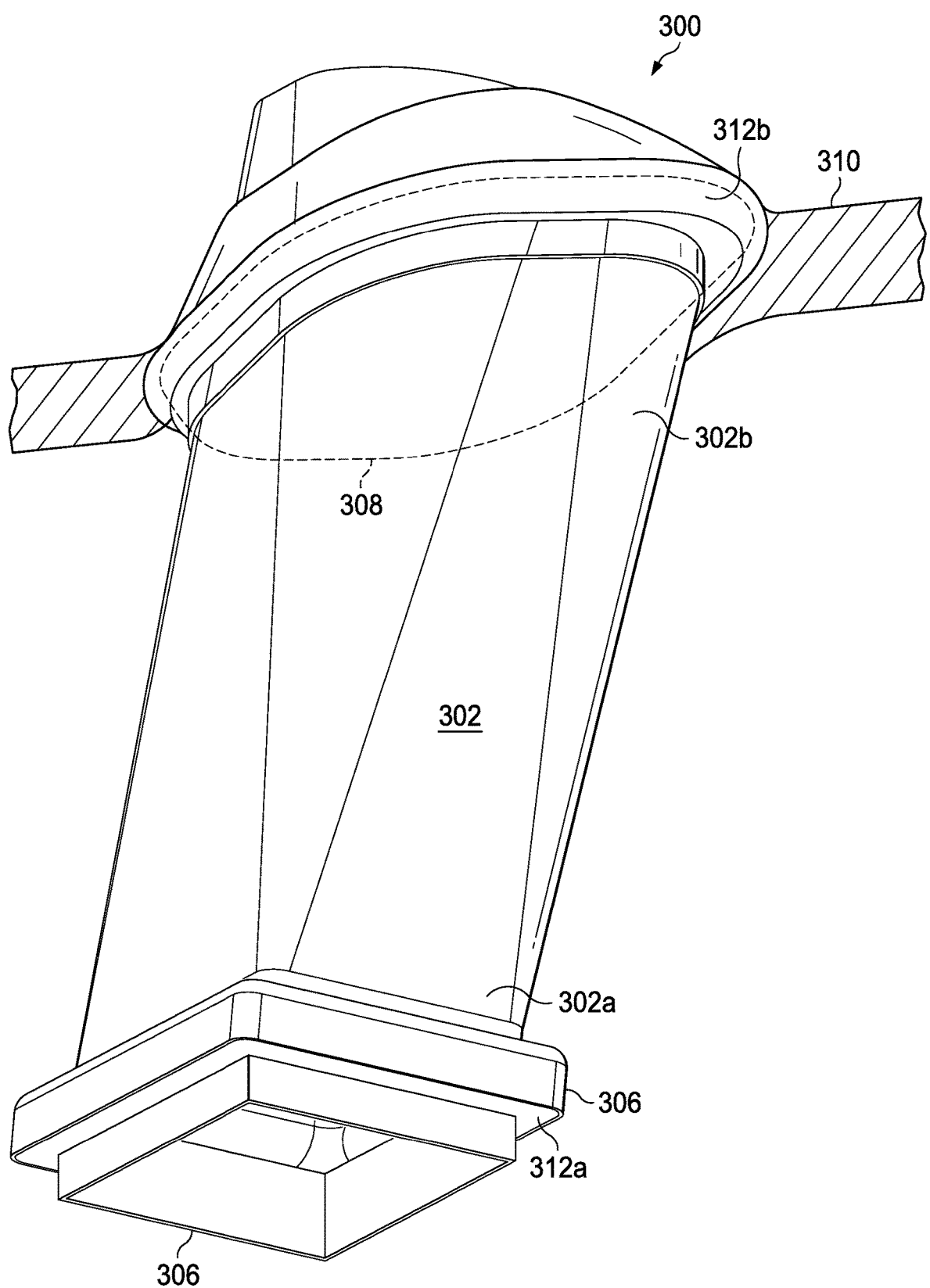
FIG. 4 shows a cut-away view of a duct interface system according to a particular embodiment of the present invention.

FIG. 4 shows a perspective view of a duct interface system 300 that illustrates an embodiment of the present invention. In this example, inlet end 302a of duct 302 is substantially sealed at inlet receptacle 306 and outlet end 302b of duct 302, coupled to outlet port 308, is substantially sealed at outlet receptacle 310 by one or more seals 312a, 312b respectively.

Figure 5A:
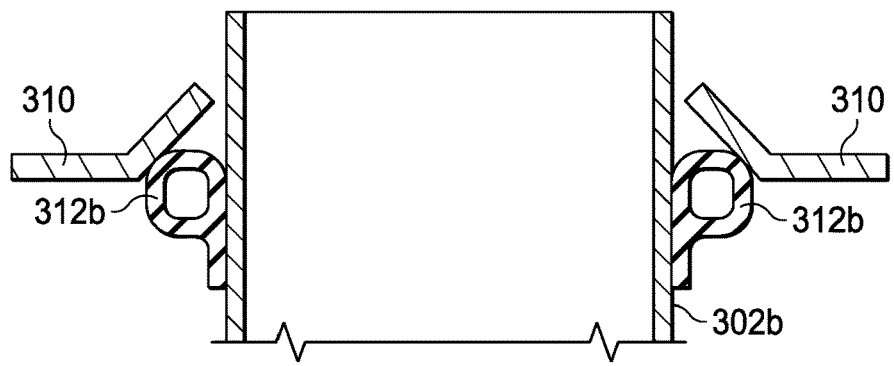
FIG. 5A shows a cross-sectional view of a duct interface system according to a particular embodiment of the present invention.
Figure 5B:
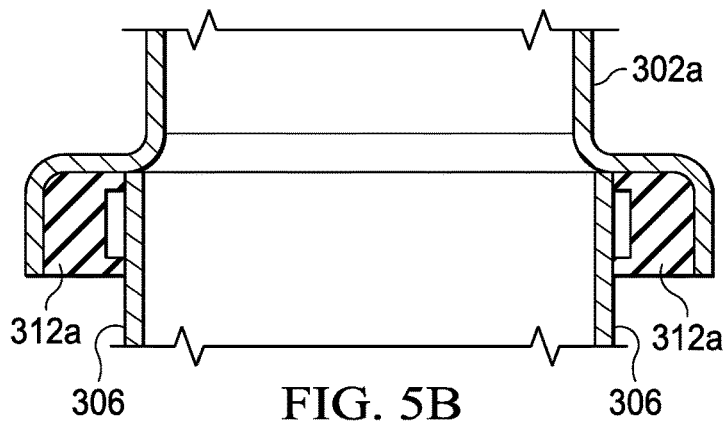
FIG. 5B shows a cross-sectional view of a duct interface system according to a particular embodiment of the present invention.

FIGS. 5A and 5B show cross-sectional views of a duct interface system 300 that illustrates the present invention. In FIG. 5A, the seal 312b is shown substantially sealing the interface between outlet end 302b of duct 302 and the outlet receptacle 310. In FIG. 5B, the seal 312a is shown substantially sealing the interface between inlet end 302a of duct 302 and the inlet receptacle 306. The duct to receptacle interfaces can be external (FIG. 5A), internal (FIG. 5B), or a combination thereof. In the aircraft 100 depicted in FIGS. 1 and 2, the present invention is used to attach to each of two separate oil cooler blowers that provide redundant oil cooling for the main transmission and without the use of fasteners or clamps.

Figure 6:
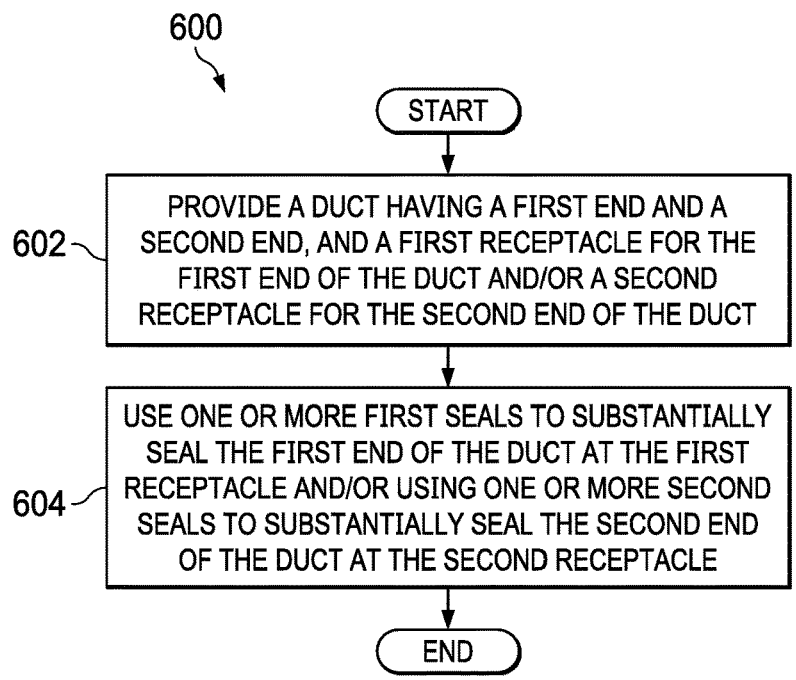
FIG. 6 shows a flowchart of a method of interfacing a duct that depicts an embodiment of the present invention.

Referring now to FIG. 6, a flowchart of a method 600 of interfacing a duct illustrates an embodiment of the present invention. The method 600 includes providing a duct having a first end and a second end, and a first receptacle for the first end of the duct and/or a second receptacle for the second end of the duct at block 602, and using one or more first seals to substantially seal the first end of the duct at the first receptacle and/or using one or more second seals to substantially seal the second end of the duct at the second receptacle in block 604.

In some embodiments, the method 600 further includes configuring the one or more first seals to substantially seal the first end of the duct at the first receptacle to allow motion of the first end of the duct relative to the first receptacle and/or configuring the one or more second seals to substantially seal the second end of the duct at the second receptacle to allow motion of the second end of the duct relative to the second receptacle. In some embodiments, the method 600 further includes configuring the one or more first seals such that the motion of the first end of the duct relative to the first receptacle does not substantially break a first seal formed by the one or more first seals and/or configuring the one or more second seals such that the motion of the second end of the duct relative to the second receptacle does not substantially break a second seal formed by the one or more second seals. In some embodiments, the method 600 further includes coupling the first end of the duct and the first receptacle and/or between the second end of the duct and the second receptacle to an input port or an output port without a mechanical attachment. In some embodiments, the coupling is accomplished without a fastener or a clamp. In some embodiments, the one or more first seals are the only devices securing the first end of the duct to the first receptacle and/or the one or more second seals are the only devices securing the second end of the duct to the second receptacle. In some embodiments, the first receptacle is coupled to an inlet port. In some embodiments, the second receptacle is coupled to an outlet port. In some embodiments, the first seal(s) and/or the second seal(s) are bulb seals, compressible seals, foam seals or gaskets.

The skilled artisan will recognize that the duct interface system 300 of the present invention provides devices for substantially sealing the inlet end 302a of the duct 302 at the inlet receptacle 306 and the outlet end 302b of the duct 302 at the outlet receptacle 310 without mechanical fasteners, such as bolts and/or clamps, thereby increasing aircraft safety and lowering maintenance costs.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A duct interface system for a rotorcraft, comprising:
   a floating duct having a first end and a second end;
   a first port having a first receptacle for the first end of the floating duct;
   a second port having a second receptacle for the second end of the floating duct;
   one or more first seals between an interior of the first end of the floating duct and an exterior of the first receptacle;
   one or more second seals between an exterior of the second end of the floating duct and an interior of the second receptacle; and
   wherein the first end of the floating duct is coupled to the first receptacle of the first port without any fasteners or clamps, and the second end of the floating duct is coupled to the second receptacle of the second port without any fasteners or clamps.

2. The system of claim 1, wherein the one or more first seals are operable to allow a first motion of the first end of the floating duct relative to the first receptacle and the one or more second seals are configured to allow a second motion of the second end of the floating duct relative to the second receptacle.

3. The system of claim 2, wherein the first motion does not substantially break a first seal formed by the one or more first seals and the second motion does not substantially break a second seal formed by the one or more second seals.

4. The system of claim 1, wherein the first port comprises an inlet port having the first receptacle or the second port comprises an outlet port having the second receptacle.

5. The system of claim 1, wherein the first seal is the only device coupling the interior of the first end of the floating duct to the exterior of the first receptacle and the second seal is the only device coupling the exterior of the second end of the floating duct to the interior of the second receptacle.

6. The system of claim 1, wherein the first receptacle is coupled to the first port comprising an inlet port.

7. The system of claim 1, wherein the second receptacle is coupled to the second port comprising an outlet port.

8. The system of claim 1, wherein the first seal(s) comprise a bulb seal, a compressible seal or a gasket and the second seal(s) comprise a bulb seal, a compressible seal or a gasket.

9. A method of interfacing a floating duct for a rotorcraft, comprising:
   providing a floating duct having a first end and a second end, and a first port having a first receptacle for the first end of the floating duct and a second port having a second receptacle for the second end of the floating duct;
   using one or more first seals to substantially seal an interior of the first end of the floating duct at an exterior of the first receptacle of the first port without any fasteners or clamps; and
   using one or more second seals to substantially seal an exterior of the second end of the floating duct at an interior of the second receptacle of the second port without any fasteners or clamps.

10. The method of claim 9, further comprising configuring the one or more first seals to substantially seal the first end of the floating duct at the first receptacle to allow a first motion of the first end of the floating duct relative to the first receptacle and configuring the one or more second seals to substantially seal the second end of the floating duct at the second receptacle to allow a second motion of the second end of the floating duct relative to the second receptacle.

11. The method of claim 10, further comprising configuring the one or more first seals such that the first motion of the first end of the floating duct relative to the first receptacle does not substantially break a first seal formed by the one or more first seals and configuring the one or more second seals such that the second motion of the second end of the floating duct relative to the second receptacle does not substantially break a second seal formed by the one or more second seals.

12. The method of claim 9, wherein the first port comprises an inlet port having the first receptacle or the second port comprises an output port having the second receptacle.

13. The method of claim 9, wherein the one or more first seals are the only devices securing the interior of the first end of the floating duct to the exterior of the first receptacle and the one or more second seals are the only devices securing the exterior of the second end of the floating duct to the interior of the second receptacle.

14. The method of claim 9, wherein the first receptacle is coupled to the first port comprising an inlet port.

15. The method of claim 9, wherein the second receptacle is coupled to the second port comprising an outlet port.

16. The method of claim 9, wherein the first seal(s) comprise a bulb seal, a compressible seal or a gasket and the second seal(s) comprise a bulb seal, a compressible seal or a gasket.

17. A rotorcraft, comprising:
a fuselage;
an engine compartment coupled to the fuselage;
an engine coupled to the engine compartment and disposed within the engine compartment;
an inlet port disposed within the fuselage, the inlet port having a first receptacle;
an outlet port disposed within the fuselage, the outlet port having a second receptacle;
a floating duct having a first end and a second end;
one or more first seals between an interior of the first end of the floating duct and an exterior of the first receptacle;
one or more second seals between an exterior of the second end of the floating duct and an interior of the second receptacle; and
wherein the first end of the floating duct is coupled to the first receptacle of the inlet port without any fasteners or clamps, and the second end of the floating duct is coupled to the second receptacle of the outlet port without any fasteners or clamps.

18. The rotorcraft of claim 17, wherein the one or more first seals are operable to allow a first motion of the first end of the floating duct relative to the first receptacle and the one or more second seals are configured to allow a second motion of the second end of the floating duct relative to the second receptacle.

19. The rotorcraft of claim 17, wherein the first seal is the only device coupling the interior of the first end of the floating duct to the exterior of the first receptacle and the second seal is the only device coupling the exterior of the second end of the floating duct to the interior of the second receptacle.

20. The rotorcraft of claim 17, wherein the first seal(s) comprise a bulb seal, a compressible seal or a gasket and the second seal(s) comprise a bulb seal, a compressible seal or a gasket.

* * * * *